United States Patent
Chen

(10) Patent No.: US 9,615,328 B2
(45) Date of Patent: Apr. 4, 2017

(54) METHOD AND DEVICE FOR REDUCING POWER CONSUMPTION

(71) Applicant: HON HAI PRECISION INDUSTRY CO., LTD., New Taipei (TW)

(72) Inventor: Chih-Hao Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/168,104

(22) Filed: May 30, 2016

(65) Prior Publication Data

US 2016/0381633 A1    Dec. 29, 2016

(30) Foreign Application Priority Data

Jun. 26, 2015    (TW) .............................. 104120631 A

(51) Int. Cl.
*H04B 5/00*    (2006.01)
*H04M 1/00*    (2006.01)
*H04W 52/02*    (2009.01)
*H04W 4/00*    (2009.01)
*H04W 76/02*    (2009.01)

(52) U.S. Cl.
CPC ....... *H04W 52/0212* (2013.01); *H04W 4/008* (2013.01); *H04W 52/0229* (2013.01); *H04W 76/023* (2013.01)

(58) Field of Classification Search
CPC ........ H04B 1/40; H04W 4/008; H04W 52/02; H04W 52/0251; H04W 52/0258; H04W 52/0261; H04W 76/02; H04W 76/023; H04W 88/02; H04M 1/6066; H04M 1/7253; H04M 2250/02
USPC .................. 455/41.1, 41.2, 41.3, 343.2, 574; 370/310, 311
See application file for complete search history.

(56) References Cited

U.S. PATENT DOCUMENTS

| | | | |
|---|---|---|---|
| 6,970,726 B2 * | 11/2005 | Takayanagi | H04W 88/02 455/343.1 |
| 8,135,444 B2 * | 3/2012 | Hildebrand | G06F 13/387 455/574 |
| 9,344,586 B2 * | 5/2016 | Hiroki | H04W 52/0229 |
| 2003/0197488 A1 | 10/2003 | Hulvey | |
| 2004/0044913 A1 | 3/2004 | Wu | |
| 2007/0000443 A1 | 1/2007 | Chien | |
| 2008/0209083 A1 | 8/2008 | Wu et al. | |
| 2009/0196209 A1 | 8/2009 | Haartsen | |
| 2015/0103708 A1 * | 4/2015 | Kang | H04W 76/023 370/311 |

FOREIGN PATENT DOCUMENTS

| | | |
|---|---|---|
| CN | 102572119 A | 7/2012 |
| EP | 1202495 A2 | 5/2002 |

\* cited by examiner

*Primary Examiner* — Quochien B Vuong
(74) *Attorney, Agent, or Firm* — Zhigang Ma

(57) ABSTRACT

A method for reducing power consumption between two devices communicating through a BLUETOOTH protocol is operable to be executed in the devices. A first device can adjust connection state according to current communication state with a second device, to achieve a compromise between power saving and effective transmission abilities.

12 Claims, 2 Drawing Sheets

METHOD AND DEVICE FOR REDUCING POWER CONSUMPTION

FIELD

The subject matter herein generally relates to power saving technologies.

BACKGROUND

BLUETOOTH Low Energy (BLE) is a short-distance wireless communication technology, which was developed from the traditional BLUETOOTH technology.

BLE connection parameters, comprising connection intervals, slave latency, supervision timeout, and the like, are used for energy saving in devices. The connection interval defines a time window during which both BLUETOOTH devices use the same frequency to transfer data. There are 37 data channels in total, and connected devices cycle through them every Connection Interval. Thus, both devices have to agree on precise values for these parameters from the beginning in order to be synchronized, i.e., connected. Since the devices may be in a sleeping (non-moving) state during the connection interval, the connection interval can be utilized to adjust power consumption. However, applying the connection intervals in energy saving is problematic.

Shortening the connection interval increases throughput in both directions, but increases power consumption and reduces data transmission times for the devices. In contrast, enlarging the connection interval reduces the throughput in both directions, reduces the power consumption, and increases data transmission times for both devices. It is' necessary to find a trade-off between the power consumption and the throughput.

BRIEF DESCRIPTION OF THE DRAWINGS

Implementations of the present technology will now be described, by way of example only, with reference to the attached figures, wherein.

DETAILED DESCRIPTION

Figure 1:
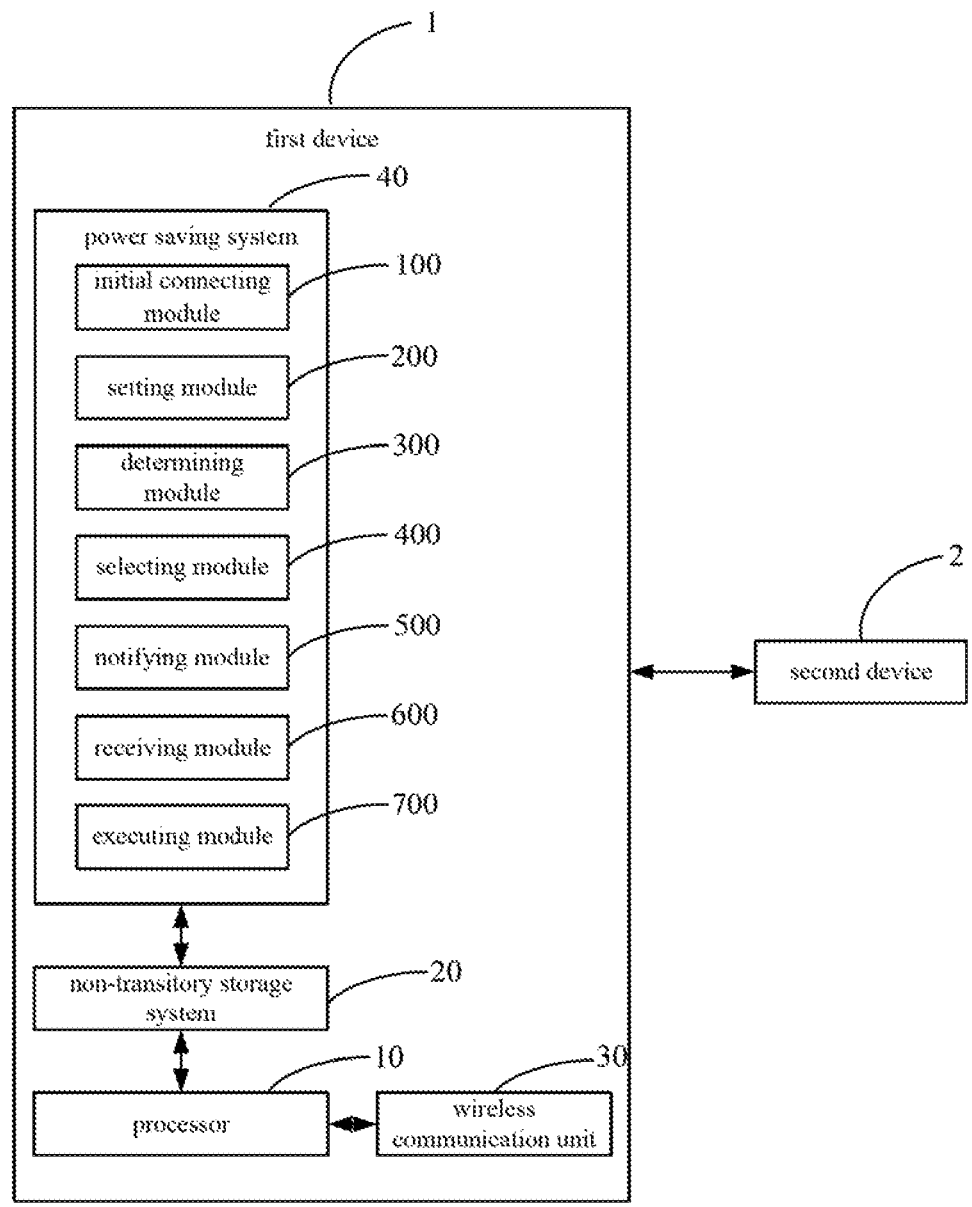
FIG. 1 illustrates a block diagram of an embodiment of functional modules of a first device able to reduce power consumption.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 illustrates functional modules of an exemplary device 2 (hereinafter, first device 1) for reducing power consumption. In one embodiment, the first device 1 includes at least one processor 10, a non-transitory storage system 20, a wireless communication unit 30 (e.g. a BLUETOOTH module), and a power saving system 40. In one embodiment, the first device 1 may be a BLUETOOTH device or a device comprising a BLUETOOTH module, and such device may be designated as master device communicating with one or more slave devices (e.g. a second device 2) using, for example, BLUETOOTH low energy protocol.

The power saving system 40 includes an initial connecting module 100, a setting module 200, a determining module 300, a selecting module 400, a notifying module 500, a receiving module 600, and an executing module 700. The modules 100-700 can include computerized code in the form of one or more programs that are stored in the non-transitory storage system 20. The computerized code includes instructions that are executed by the at least one processor 10 to provide functions for the modules 100-700. In at least one embodiment, the non-transitory storage system 20 may include a hard disk drive, a flash memory, a cache, or another computerized memory device. The first device 1 has a power mode characteristic comprising a plurality of power modes, the second device 2 has a plurality of connection parameters wherein one of the connection parameters corresponds to one of the power modes of the first device 1.

The initial connecting module 100 establishes an initial connection between the first device 1 and the second device 2. In one embodiment, the initial connection module 100 sends a connection request containing a second connection parameter to the second device 2, and then connects the first device 1 to the second device 2 according to a feedback from the second device 2. In another embodiment, the initial connection module 100 connects the first device 1 to the second device 2 using a third connection parameter corresponding to an initiation mode before receiving any connection parameter update request transmitted from the second device 2.

In one embodiment, for example, when the first device 1 needs to establish an initial connection with the second device 2, the initial connecting module 100 sends a connection request to the second device 2, wherein the connection request contains at least one desired (a second) connection parameter. In response to the connection request transmitted from the first device 1, the second device 2 updates/configures connection settings according to the second connection parameter, and sends an acknowledgement to the first device 1 after the connection settings are updated successfully. Finally the initial connecting module 100, via the second connection parameter, establishes the initial connection between the first device 1 and the second device 2 after receiving the acknowledgement from the second device 2.

In one embodiment, the second device 2 may send a connection parameter update request to the first device 1. Before receiving the connection parameter update request transmitted from the second device 2, the initial connecting module 100 can pre-establish the initial connection between the first device 1 and the second device 2 via a third connection parameter corresponding to the initiation mode.

The setting module 200 may pre-set a power mode characteristic providing a plurality of power modes for the first device 1, and pre-set a plurality of connection parameters (or sets of connection parameters) for the first device 1 and the second device 2. Wherein, one of the connection parameters corresponds to one of the plurality of power modes. In one embodiment, the setting module 200 creates a power manager service via a generic attribute profile (GATT) layer, wherein the power manager service includes the power mode characteristic. The power mode characteristic includes an initiation mode, a low power mode, and a data transmission mode. The setting module 200 assigns at least three connection parameters for the second device 2 via a generic access profile (GAP) layer, wherein the three connection parameters respectively correspond to the initiation mode, the low power mode, and the data transmission mode.

For example, the setting module 200 may pre-set a first connection parameter, a second connection parameter, and a third connection parameter in the GAP layer of the first device 1; and send the first, second, and third connection parameters to the second device 2. The setting module 200 establishes a power manager service in the GATT layer of the first device 1, and pre-sets a power mode characteristic in the power manager service, for example, an initiation mode, a lower power mode, or a data transmission mode. The first device 1 can change the state of connection with the second device 2 by switching between different power modes in the power manager service.

The determining module 300 determines a communication state between the first device 1 and the second device 2. In one embodiment, the determining module 300 may determine the communication state based on a result of monitoring communication channels. For example, the determining module 300 may determine that the communication state is in the lower power state when the determining module 300 does not monitor data packets within a preset time. In other embodiments, the communication state may be determined by other factors. The communication state may also be determined and classified according to data flow per unit of time.

The selecting module 400 selects, from the plurality of power modes, a first power mode based on the communication state. In one embodiment, the selecting module 400, by GATT server of the first device 1, can set the power mode characteristic into the initiation mode when the communication state is determined as standing in an initial state; the power mode characteristic can be set into the low power mode when the determined communication state is standing in a low power state; the power mode characteristic can be set into the data transmission mode when the determined communication state is standing in a transmission state.

The notifying module 500 notifies the second device 2 of the first power mode to enable the second device 2 to update/configure a first connection parameter corresponding to the first power mode.

For example, the selecting module 400 can match the power mode characteristic to the low power mode by the GATT server when the determining module 300 determines that the communication state between the first device 1 and the second device 2 is that of the low power state. The notifying module 500 can then notify the second device 2 of the low power mode, to enable the second device 2 to set or configure a connection parameter corresponding to the low power mode, according to the notification.

The receiving module 600 receives a first feedback from the second device 2. In one embodiment, the second device 2 sets or configures the corresponding first connection parameter according to the first power mode notified by the notifying module 500, and then sends a first feedback to the first device 1 when the corresponding first connection parameter has been set successfully. The first device 1 executes the next operation based on the first feedback transmitted from the second device 2.

The executing module 700 adjusts a connection state between the first device 1 and the second device 2 according to the first feedback.

In one embodiment, for example, the second device 2 sets or configures the connection parameter corresponding to the low power mode when a notification is received that the power mode characteristic is set to the low power mode. An ACKN can be sent to the first device 1 when the corresponding connection parameter is set successfully. After receiving the ACKN, the executing module 700 adjusts the connection state between the first device 1 and the second device 2 to that of the low power mode.

In one embodiment, the first feedback may include connection parameters (e.g. minimum connection interval, maximum connection interval, slave latency, and timeout), acknowledgements, and other information.

Figure 2:
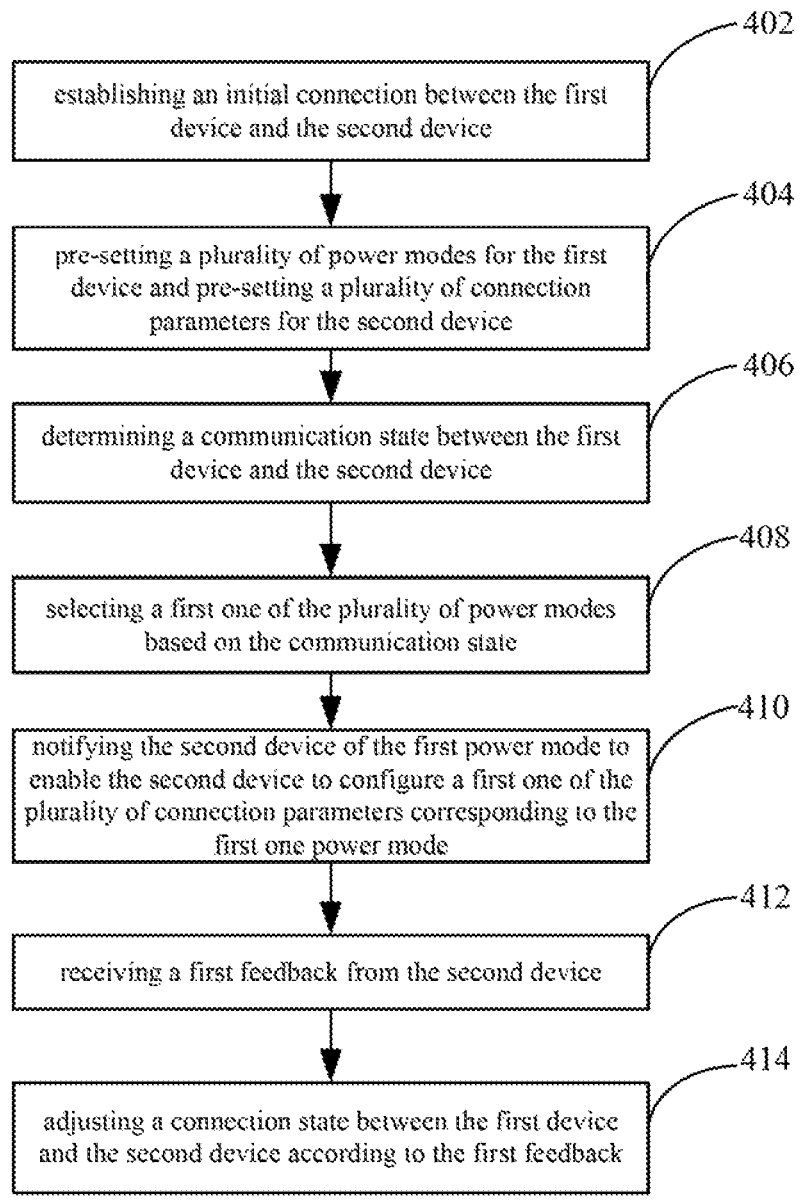
FIG. 2 illustrates a flowchart of an embodiment of a method for devices in communication to reduce power consumption.

FIG. 2 illustrates a flowchart of a method for functional modules of a first device to reduce power consumption. The method is provided by way of example as there are a variety of ways to carry out the method. The method is operable to be executed in a first device having a power mode characteristic providing a plurality of power modes. The method requires the first device to be adapted to communicate with a second device using, for example, a BLUETOOTH low energy protocol, the second device having a plurality of connection parameters, wherein one of the connection parameters corresponds to one of the power modes. As is known to all, the method is also operable to be executed in other communicating devices. The illustrated order of blocks is by example only and the order of the blocks can change. The method can begin at block 402.

At block 402, the first device establishes an initial connection between the first device and the second device. In one embodiment, the first device sends a connection request containing a second connection parameter to the second device and then connects to the second device according to a second feedback transmitted from the second device. In another embodiment, the first device connects to the second device using a third connection parameter corresponding to the initiation mode before receiving a parameter update request transmitted from the second device.

At block 404, the first device pre-configures or pre-sets a power mode characteristic providing a plurality of power modes for the first device, and pre-configures a plurality of connection parameters for the first device and the second device. Wherein, one of the connection parameters corresponds to one of the power modes.

In one embodiment, in a generic attribute profile (GATT) layer, the first device pre-sets a power manager service including a power mode characteristic. The power mode characteristic includes an initiation mode, a low power mode, and a data transmission mode. The first device creates a power manager service via a generic attribute profile (GATT) layer, wherein the power manager service includes the power mode characteristic. The power mode characteristic includes an initiation mode, a low power mode, and a data transmission mode. The first device assigns at least three connection parameters for the second device via a generic access profile (GAP) layer, wherein the three connection parameters respectively correspond to the initiation mode, the low power mode, and the data transmission mode.

At block 406, the first device determines a communication state between the first device and the second device. In one embodiment, the first device may make a determination as to the communication state based on a result of monitoring communication channels. For example, the first device can determine that the communication state is in the low power state when the first device does not monitor data packets within a preset time. In other embodiments, the communication state may be determined by other factors.

At block 408, the first device selects a first power mode based on the communication state, the first power mode may be one of the plurality of power modes. In one embodiment, the first device, by GATT server, matches the power mode characteristic to the initiation mode when the determined communication state stands in an initial state. When the determined communication state stands in a low power state the power mode characteristic can be matched to the low power mode; and the power mode characteristic can be matched to the data transmission mode when the determined communication state stands in a transmission state.

At block 410, the first device gives notification of the first power mode to the second device 2 to enable the second device to update/configure a first connection parameter corresponding to the first power mode.

At block 412, the first device receives a first feedback from the second device. In one embodiment, the second device sets or configures the corresponding connection parameter according to characteristic value of the first power mode, and sends a first feedback to the first device when the corresponding parameter has been set successfully. The first device executes the next operation based on the first feedback transmitted from the second device.

At block 414, the first device adjusts a connection state between the first device and the second device according to the first feedback.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A method for reducing power consumption, performed by a first device, the first device adapted to communicate with a second device using a Bluetooth low energy protocol, the method comprising:

pre-setting a plurality of power modes for the first device and pre-setting a plurality of connection parameters for the second device, wherein one of the plurality of connection parameters corresponds to one of the plurality of power modes;

determining a communication state between the first device and the second device;

selecting a first one of the plurality of power modes based on the communication state;

notifying the second device of the first power mode to enable the second device to configure a first one of the plurality of connection parameters corresponding to the first one power mode;

receiving a first feedback from the second device; and adjusting a connection state between the first device and the second device according to the first feedback.

2. The method as claimed in claim 1, further comprising:

creating a power manager service via a generic attribute profile, wherein the power manager service includes a power mode characteristic providing the plurality of power modes, the plurality of power modes includes an initiation mode, a low power mode and a data transmission mode; and assigning at least three connection parameters for the second device via a generic access profile, wherein the three connection parameters respectively correspond to the initiation mode, the low power mode and the data transmission mode.

3. The method as claimed in claim 2, further comprising:

establishing an initial connection between the first device and the second device, wherein the establishing step further comprises:

sending a connection request containing a second connection parameter to the second device, and connecting the first device to the second device according to a second feedback from the second device; or connecting the first device to the second device via a third connection parameter corresponding to the initiation mode before receiving a parameter update request.

4. The method as claimed in claim 2, wherein the selecting step further comprises:

setting the power mode characteristic as the initiation mode when the communication state stands in an initial state;

setting the power mode characteristic as the low power mode when the communication state stands in a low power state; and setting the power mode characteristic as the data transmission mode when the communication state stands in a transmission state.

5. A device for reducing power consumption, comprising:

a wireless communication unit for communicating with a second device using a Bluetooth low energy protocol;

at least one processor;

a non-transitory storage system coupled to the at least one processor and configured to store one or more programs that are executed by the at least one processor, the one or more programs including instructions for:

pre-setting a plurality of power modes for the first device and pre-setting a plurality of connection parameters for the second device, wherein one of the plurality of connection parameters respectively corresponds to one of the plurality of power modes;

determining a communication state between the first device and the second device;

selecting a first one of the plurality of power modes based on the communication state;
notifying the second device of the first power mode to enable the second device to configure a first one of the plurality of connection parameters corresponding to the first one power mode;
receiving a first feedback from the second device; and
adjusting a connection state between the device and the second device according to the first feedback.

6. The device as claimed in claim 5, further comprising:
creating a power manager service via a generic attribute profile, wherein the power manager service includes a power mode characteristic providing the plurality of power modes, the plurality of power modes includes an initiation mode, a low power mode and a data transmission mode; and
assigning at least three connection parameters for the second device via a generic access profile, wherein the three connection parameters respectively correspond to the initiation mode, the low power mode and the data transmission mode.

7. The device as claimed in claim 6, further comprising:
establishing an initial connection between the first device and the second device, wherein the establishing step further comprises:
sending a connection request containing a second connection parameter to the second device, and connecting the first device to the second device according to a second feedback from the second device; or
connecting the first device to the second device via a third connection parameter corresponding to the initiation mode before receiving a parameter update request.

8. The device as claimed in claim 6, wherein the selecting step further comprises:
setting the power mode characteristic as the initiation mode when the determined communication state stands in an initial state;
setting the power mode characteristic as the low power mode when the determined communication state stands in a low power state; and
setting the power mode characteristic as the data transmission mode when the determined communication state stands in a transmission state.

9. A method for reducing power consumption, performed by a first device having a plurality of power modes, the first device adapted to communicate with a second device, the second device having sets of connection parameters, each set corresponds to one of the plurality of power modes, the method comprising:
determining a communication state between the first device and the second device;
selecting a first one of the plurality of power modes based on the communication state;
notifying to the second device of the first power mode to enable the second device to configure a first one of the sets of connection parameters corresponding to the first one power mode;
receiving a first feedback from the second device; and
adjusting a connection state between the first device and the second device according to the first feedback.

10. The method as claimed in claim 9, further comprising:
creating a power manager service via a generic attribute profile, wherein the power manager service includes a power mode characteristic providing the plurality of power modes, the plurality of power modes includes an initiation mode, a low power mode and a data transmission mode; and
assigning at least three sets of connection parameters for the second device via a generic access profile;
wherein three sets of connection parameters respectively correspond to the initiation mode, the low power mode and the data transmission mode.

11. The method as claimed in claim 10, wherein the method further comprising:
establishing an initial connection between the first device and the second device, wherein the establishing step further comprises:
sending a connection request containing a second set of connection parameters to the second device, and connecting the first device to the second device according to a second feedback from the second device; or
connecting the first device to the second device via a third set of connection parameters corresponding to the initiation mode before receiving a parameter update request transmitted from the second device.

12. The method as claimed in claim 10, wherein the selecting step further comprises:
setting the power mode characteristic into the initiation mode when the determined communication state stands in an initial state;
setting the power mode characteristic into the low power mode when the determined communication state stands in a low power state; or
setting the power mode characteristic into the data transmission mode when the determined communication state stands in a transmission state.

* * * * *